(12) United States Patent
Ancora et al.

(10) Patent No.: US 8,837,269 B2
(45) Date of Patent: Sep. 16, 2014

(54) PROCESS FOR INTER-CELL INTERFERENCE CANCELLATION IN A SYNCHRONIZED OFDM SYSTEM, AND APPARATUS FOR THE SAME

(75) Inventors: Andrea Ancora, Nice (FR); Fabrizio Tomatis, Vallauris (FR)

(73) Assignees: ST-Ericsson SA, Plan-les-Ouates (CH); ST-Ericsson (France) SAS, Grenoble (FR)

( * ) Notice: Subject to any disclaimer, the term of this patent is extended or adjusted under 35 U.S.C. 154(b) by 132 days.

(21) Appl. No.: 13/382,891

(22) PCT Filed: Jul. 6, 2010

(86) PCT No.: PCT/EP2010/004078
§ 371 (c)(1),
(2), (4) Date: Mar. 6, 2012

(87) PCT Pub. No.: WO2011/003573
PCT Pub. Date: Jan. 13, 2011

(65) Prior Publication Data
US 2012/0155411 A1 Jun. 21, 2012

(30) Foreign Application Priority Data

Jul. 7, 2009 (EP) .................................. 09368023

(51) Int. Cl.
| | | |
|---|---|---|
| H04W 4/00 | (2009.01) |
| H04J 1/00 | (2006.01) |
| H04J 3/06 | (2006.01) |
| H04L 27/28 | (2006.01) |
| H04B 15/00 | (2006.01) |
| H04W 72/00 | (2009.01) |
| H04B 7/00 | (2006.01) |
| H04L 25/02 | (2006.01) |
| H04J 11/00 | (2006.01) |
| H04L 25/03 | (2006.01) |
| H04L 5/00 | (2006.01) |
| H04L 27/26 | (2006.01) |

(52) U.S. Cl.
CPC ... *H04J 11/0056* (2013.01); *H04L 2025/03414* (2013.01); *H04L 5/0023* (2013.01); *H04L 25/03242* (2013.01); *H04L 25/0256* (2013.01); *H04L 2025/03426* (2013.01); *H04L 5/0032* (2013.01); *H04L 5/0053* (2013.01); *H04L 5/0094* (2013.01); *H04L 27/2656* (2013.01)
USPC .......... 370/203; 370/329; 370/343; 370/350; 375/260; 375/346; 455/63.1; 455/450; 455/501; 455/502; 455/509

(58) Field of Classification Search
CPC ......... H04L 1/20; H04L 5/0007; H04L 5/023; H04L 5/0048; H04L 7/042; H04L 27/2647; H04L 27/2657; H04L 27/2662; H04B 1/123; H04B 1/1027; H04B 1/11027; H04B 1/036; H04B 7/2693; H04B 15/00; H04B 17/0057; H04J 3/0682; H03J 7/30; H03J 7/305; H03J 1/006; H03G 3/348; G04C 23/00; H04W 16/10; H04W 16/14; H04W 28/04; H04W 28/16; H04W 56/00; H04W 56/0035; H04W 56/0045; H04W 72/04; H04W 72/042; H04W 72/044; H04W 72/082; H04W 76/02; H04W 84/08; H04W 84/18; H04W 88/08
USPC ......... 370/322, 329, 331, 335, 341, 348, 203, 370/343, 350; 455/63.1, 67.13, 423, 424, 455/425, 445, 450, 501, 502, 509; 375/260, 375/346
See application file for complete search history.

(56) References Cited

U.S. PATENT DOCUMENTS

| | | | |
|---|---|---|---|
| 6,771,934 B2 * | 8/2004 | Demers et al. ............... 455/63.1 |
| 2006/0009200 A1 * | 1/2006 | Jung et al. .................. 455/414.1 |
| 2006/0056354 A1 * | 3/2006 | Vasudevan et al. ........... 370/332 |
| 2006/0274836 A1 * | 12/2006 | Sampath et al. .............. 375/242 |
| 2008/0009256 A1 * | 1/2008 | Anderson ..................... 455/296 |
| 2010/0009705 A1 * | 1/2010 | Budianu et al. ............... 455/501 |

FOREIGN PATENT DOCUMENTS

WO    2009120725 A2    10/2009

OTHER PUBLICATIONS

Patent Cooperation Treaty; International Preliminary Report on Patentability of PCT/EP2010/004078; Jan. 10, 2012; Agnes Wittman-Regis; 8 pages.

Patent Cooperation Treaty; International Search Report and Written Opinion of PCT/EP2010/004078; Oct. 19, 2010; Frederic Bauer; 10 pages.

European Search Report for EP 09368023.9; Dec. 3, 2009; Frederic Bauer; 8 pages.

Ritt et al: "Signalling for uplink 1-15 inter-cell interference cancellation" 3GPP Draft ; RI-060893 , 3rd Generation Partnership Project (3GPP), Mobile Competence Centre , 650, Route Des Lucioles , F-06921 Sophia-Antipolis Cedex , France, vol. RAN WGI, No. Athens, Greece; 20060320, Mar. 20, 2006, 3 pages.

Ritt: "TP on uplink inter-cell interference cancellation" 3GPP Draft; RI-060202, 3rd Generation Partnership Project (3GPP), Mobile Competence Centre ; 650, Route Des Lucioles ; F-06921 Sophia-Antipolis Cedex ; France, vol. RAN WGI, No. Helsinki, Finland; 20060118, Jan. 18, 2006, 3 pages.

Ritt et al: "Signalling for downlink inter-cell interference cancellation" 3GPP Draft; RI-060892, 3rd Generation Partnership Project (3GPP), Mobile Competence Centre ; 650, Route Des Lucioles ; F-06921 Sophia-Antipolis Cedex ; France, vol. RAN WGI, No. Athens, Greece; 20060320, Mar. 20, 2006, 3 pages.

Boudreau G et al: "Interference coordination and cancellation for 4G networks—[LTE part II: 3GPP release 8]" IEEE Communications Magazine, IEEE Service Center, Piscataway, US, vol. 47, No. 4, Apr. 1, 2009, pp. 74-81.

\* cited by examiner

*Primary Examiner* — Alpus H Hsu
*Assistant Examiner* — Dharmesh Patel
(74) *Attorney, Agent, or Firm* — Howison & Arnott, LLP (57) ABSTRACT

A process for cancelling inter-cell interference between neighboring cells in a synchronized OFDM communication system allowing communication between one User Equipment (UE) fitted with at least two antennas and one serving base station is provided. The process allows multi-antenna mobile receiver in a UE to receive downlink information from a base station that includes both information relating to proper communication with the base station and additional information that was received by the base station from a neighboring base station that provides interference data about another UE. The multi-antenna UE is adapted to use the downlink information in its receiver circuitry to cancel the interference from the other UE.

14 Claims, 7 Drawing Sheets

PROCESS FOR INTER-CELL INTERFERENCE CANCELLATION IN A SYNCHRONIZED OFDM SYSTEM, AND APPARATUS FOR THE SAME

CROSS-REFERENCE TO RELATED APPLICATIONS

This application is a U.S. National Phase application submitted under 35 U.S.C. §371 of Patent Cooperation Treaty application serial no. PCT/EP2010/004078, filed Jul. 6, 2010, and entitled PROCESS FOR INTER-CELL INTERFERENCE CANCELLATION IN A SYNCHRONIZED OFDM SYSTEM, AND APPARATUS FOR THE SAME, which application claims priority to European patent application serial no. EP 09368023.9, filed Jul. 7, 2009, and entitled PROCESS FOR INTER-CELL INTERFERENCE CANCELLATION IN A SYNCHRONIZED OFDM SYSTEM, AND APPARATUS FOR THE SAME.

Patent Cooperation Treaty application serial no. PCT/EP2010/004078, published as WO 2011/003573, and European patent application serial no. EP 09368023.9, are incorporated herein by reference.

TECHNICAL FIELD

The invention relates to digital wireless communication and particularly to a process for canceling inter-cell interference in a synchronized OFDM communication system, a Base station and an apparatus (base station, UE) for the same.

BACKGROUND

Digital wireless communication is being widely used throughout the world particularly with the latest development of the Orthogonal Frequency Division Multiplex (OFDM systems) and the last evolution, namely the so-called Long Term Evolution (LTE) systems.

With the advent of those new systems and the development of OFDM, the number of communicating cells and users will tremendously increase over one given area.

This will strongly increase the level of interference of the communications between the UEs and the Cells, and improved techniques will be required for canceling the interference resulting from a continuously increasing number of base stations.

As known by a skilled man, the system capacity is limited by means of cell-edge interference. The current release 8 of LTE focused on semi-static techniques for the purpose of properly handling interference between different cells, for instance as shown in FIG. 1, a first cell 100 based on a Base Station eNBs 150, and other cells, such as a second cell 200 based on a eNBs Base Station 250 and a third cell 300 based on a BS 350.

Figure 1:
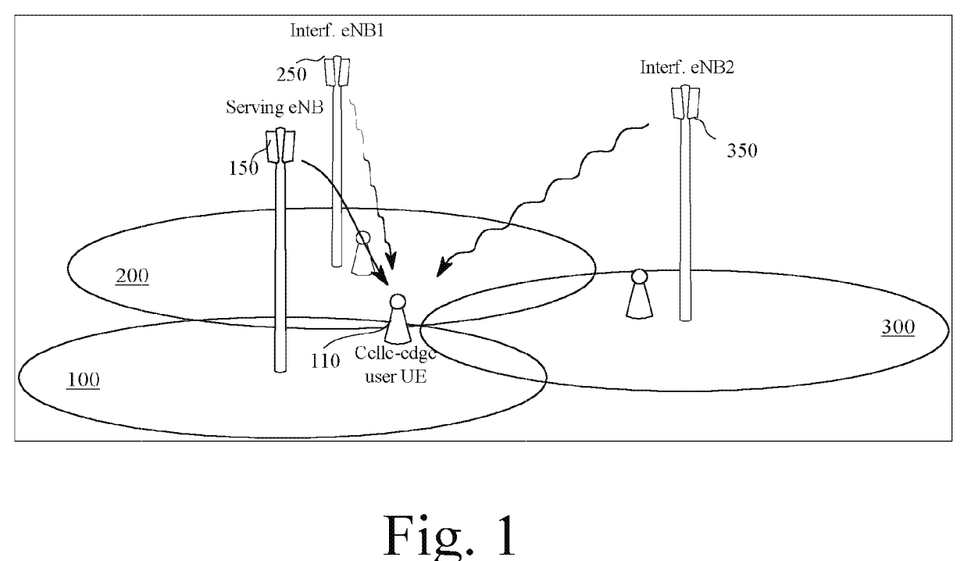
FIG. 1 illustrates an OFDM digital communication network showing three interfering cells.

It can be seen in FIG. 1 that communication between a user equipment 110 and its serving base station eNBs 150 may be spoiled by interference produced by the communication of a base station 250 and a base station 350.

Generally speaking, the concept of Fractional frequency re-use was designed for the purpose of reducing interference between two neighboring cells. Nevertheless, Fractional frequency re-use entail constraints on cell-edge scheduling and frequency resources loss which turns as well into a system capacity limitation.

Alternatively, the technique of beamforming was also introduced so as to generate a beam being directed to the actual direction of the relevant UE and thus to reduce the disturbance of the other UE.

All those techniques show the relevance of the problem of inter-cell interference.

The problem to be solved by the present invention is to provide an alternative interference cancellation process which is still effective and simple to carry out.

SUMMARY

It is an object of the present invention to carry out a process for improving known technique of interference cancellation in a synchronous OFDM digital communication network, such as the LTE-advanced.

It is another object of the present invention to provide a signaling scheme between the target UE and the target BS to allow the interference cancellation for a synchronous OFDM cellular system (in particular LTE-Advanced).

It is a further object of the present invention to define a new downlink control information scheme to be applied to a mobile communication system based on synchronous OFDM and more in particular to the LTE-Advanced, to allow the UE (User Equipment) canceling the inter-cell interference (interference due to neighbor base stations).

It is still a further object of the present invention to carry out a receiver for a synchronous OFDM cellular system which achieves efficient OFDM receiving and interference cancellation of the present interfering base stations or antennas.

These and other objects of the invention are achieved by means of a process for cancelling inter-cell interference between neighboring cells in a synchronized OFDM communication system allowing communication between one User Equipment fitted with at least two antennas and one serving Base station (eBS) involving the steps of:

arranging a communication channel between said Base Station (150) and a neighboring base station, said communication channel being used for exchanging information relevant to the communication of said neighboring base station and the strongest interfering UE; communicating to the UE downlink control information relating to the proper communication with said base station and further including said information received from the neighboring base station; whereby said UE can use such information as a downlink control information for the purpose of interference cancellation.

This results in the possibility given to the User Equipement to use the extended Downlink Control Information reported by the neighboring Base station to enhance the interference cancellation of the strongest UE in that neighboring cell.

In one embodiment, the downlink control information comprises information defining the modulation used in the neighboring cell, e.g. QPSK, a 16QAM or a 64 QAM.

In one particular embodiment, the downlink control information includes the rate of coding used in the neighboring cell.

Preferably the interference cancellation is performed either by means of a MMSE equalizer, or a near-Maximum Likelihood decoder, such as a sphere decoder.

In one embodiment, the rate of coding is used in the receiver for re-encoding the detected interference data symbols (IDS) so as to in-inject them in an interference cancellation loop.

The invention also achieves a base station for a synchronous OFDM communication system which comprises:

means for arranging a communication channel between said Base Station (150) and a neighboring base station, said communication channel being used for exchanging information relevant to the communication of said neighboring base station and the strongest interefering UE; means for communicating to the UE downlink control information relating to the proper communication with said base station and further including said information received from the neighboring base station; whereby said UE can use such information as a downlink control information for the purpose of interference cancellation.

At last, the invention achieves a User Equipment (UE) for a synchronized OFDM communication system allowing communication with a base station, said UE comprising at least two antennas, and further including:

means for receiving from said base station Downlink Control information relevant to the communication with said base station and further including information relevant to the communication of the strongest interfering UE located in a neighboring cell; using said downlink control information in a receiver for the purpose of cancelling the interference of said strongest UE.

The invention is particularly adapted to the future LTE-advanced network.

BRIEF DESCRIPTION OF THE DRAWINGS

Other features of one or more embodiments of the invention will best be understood by reference to the following detailed description when read in conjunction with the accompanying drawings.

DETAILED DESCRIPTION

There will now be described how one can significantly improve the cancellation of the interference generated by the multiple communications established in a synchronous OFDM communication system, comprising a set of base stations or cells, as shown in FIG. 1, with at least one communicating with one user equipment (UE).

The invention will be particularly described in relation with the Long Term Evolution (LTE) standard which is the next step of the evolution of digital wireless communications, and the so-called LTE-advanced version of which will be based on a set of synchronous base stations.

However, it should be clear that this is only one particular embodiment and application of the invention and the invention may be used in any cellular system based on a OFDM modulation with synchronous cells or base stations. Indeed, the OFDM modulation is widely spread in many existing standards (such as DAB, DVB-T, WiMAX, IEEE 802.16, ADSL, WLAN IEEE 802.11a/g, etc.) and expected to be used in many future developing standards.

Because of the continuous increase of the density of the cells composing the synchronous OFDM digital network, one communication between a UE and its serving base station might be subject of disturbance from interference generated by communications occurring in neighboring cells (and sharing the same frequency subcarriers).

Figure 2:
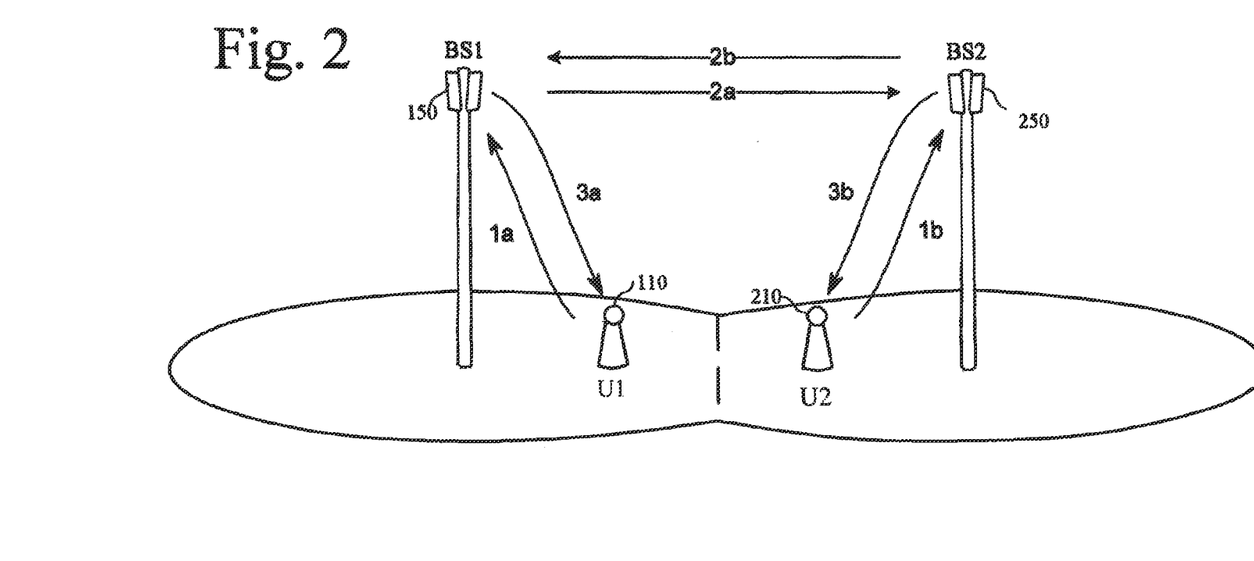
FIG. 2 illustrates one embodiment of the exchange of downlink control information in accordance of the present invention.

Such disturbance is likely to be maximum when one UE comes in the close vicinity of the limit between two contiguous cells, such as cell 100 and 200 of FIG. 2.

Indeed, with respect to FIG. 2, one sees that communication between UE 110 and base station 150 can suffer inter-cell interference produced by the communication between UE 210 and its own base station 250.

In order to reduce such inter-cell interference, there is disclosed to extend the downlink control information which is transmitted to UE 110 and 210, respectively, with additional information relevant to the communication in the neighboring cell (cell 200 or 100 resp.), which the UE may use for the purpose of interference cancellation.

UE 110 (resp. 210) are arranged to include multi-antenna mobile receivers and, therefore, can use such additional signaling generated by the neighboring cells for the purpose of canceling the interference.

It has been observed that advanced inter-cell interference cancellation is made possible at the cost of only a slight additional signalization between two contiguous BS and also with the UE.

Single User-MIMO LTE receivers can in fact be seen as interference canceller capable receivers, SU-MIMO being nothing but a form of controlled interference where the same serving eNB can be seen as the source of several interfering data streams at the same time.

Figure 3:
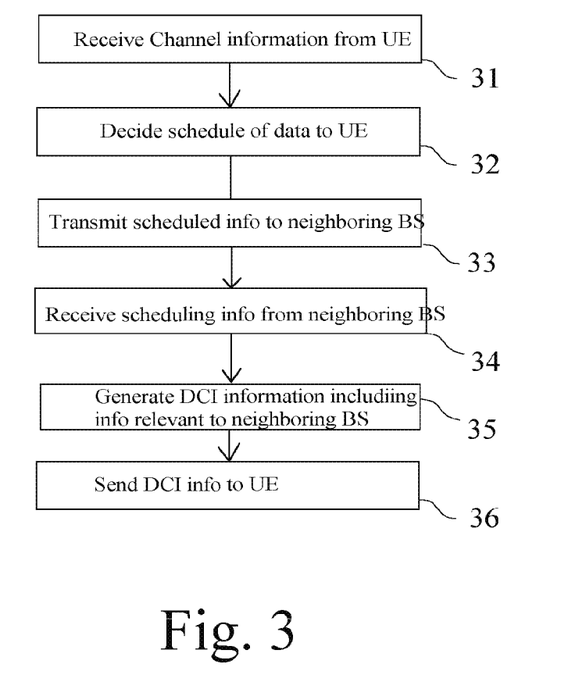
FIG. 3 illustrates a flow chart of the process according to one embodiment of the invention.

With respect to FIG. 3 (taken in combination with FIG. 2), there is now described one embodiment of the process executed in one base station (e.g., base station 150 for the sake of clarity) for the purpose of achieving inter-cell interference cancellation.

In a step 31, the base station, e.g. BS 150 receives channel information reported from the UE (e.g., 110) in accordance with conventional channel estimation methods. Channel estimation techniques are well known to the skilled and are not part of the subject invention. They will not be further elaborated. It suffices to remind that pilot or reference signals are received by the User Equipment which, on the basis of those signals, is able to estimate the channel characteristics.

The communication by the UE 110 and 210 of the channel characteristics to their serving BS 150 and 250, is depicted in FIG. 2 by arrows 1a and 1b, respectively.

In a step 32, the base station 150 proceeds with the schedule of the data information to be transmitted in the next block or frame to the associated UE 110.

Then, in a step 33, the process proceeds with the transmission of scheduling information to the neighboring base station 250. The information which is forwarded to BS 250 relates to the communication between BS 150 and UE 110 in cell 100.

Therefore, and this is an unique to that process, the base station 250 of cell 200 receives information relevant to the communication of the neighboring cell 100—and vice versa—so as to give the two contiguous base stations proper information relevant to the communication occurring in the neighboring cell and corresponding to the most interfering UE.

In one embodiment, the information forwarded to the neighboring base station includes frequency allocation, modulation order and optionally the rate of the turbo coding.

In one embodiment, such information is only limited to two additional bits defining the order of the modulation (Quadrature Phase Shift Keying, 16QAM or 64 QAM).

The process then proceeds with a step 34, wherein the BS also receives control information from its neighboring base station, thus completing a mutual exchange of information between the two neighboring base stations for the purpose of achieving inter-cell interference cancellation.

The mutual communication between BS 150 and BS250 is represented by arrows 2a and 2b in FIG. 2.

Then, in a step 35, the Base station 150 proceeds with the construction of an extended Downlink Control Information to its served UE 110 which, not only includes the conventional downlink control information relevant to its own communication (frequency, modulation, rate of coding etc.) but further includes the additional information received in step 34 from the neighboring base station so as to facilitate interference cancellation.

Then, in a step 36, the base station 150 transmits such extended Downlink Control Information to the User Equipment 110.

It should be noticed that the transmission of the extended Downlink Control information to the UE is achieved as is conventionally done, i.e., is allocated the conventional sub-carriers within the OFDM frame and sub-frame being forwarded.

Figure 4:
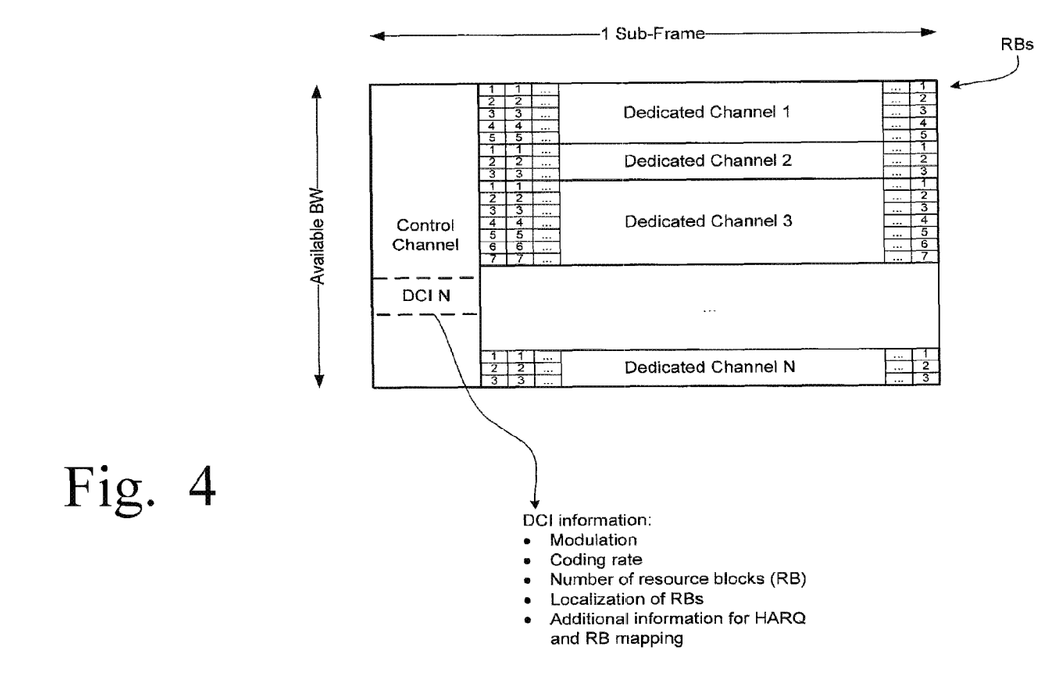
FIG. 4 illustrates the general format of one OFDM blocks comprising extended Downlink Control Information in accordance with one embodiment.

FIG. 4 illustrates the general structure of one sub-frame, the horizontal axis being representative of the time and the vertical axis being represented of the frequencies.

It can be seen that the Downlink Control Information is embedded within the Control channel located at the beginning of the sub-frame, as is conventionally done, and the additional downlink control information being introduced may include at least one of the followings:

1. the order of the modulation;
2. the Coding rate for the purpose of achieving turbo-code decoding;
3. the Number of resource blocks (RB),
4. the localization of the Resources Blocks
5. information relevant to HARQ and RB mapping etc.

As known by the skilled man, the Resources Blocks (RB) correspond to the subcarriers being allocated to the transmission.

Clearly, the structure of the OFDM frame and sub-frames is well known to the skilled man and will not be further elaborated.

The reader should notice that the OFDM block which is forwarded to one UE, e.g., UE 110, now not only includes DCI information relating to the communication between UE 110 and the serving BS 150, but further information relevant to the most interfering UE, namely UE 210.

Thanks to the provision of such extended control information, the UE 110 may now use such information, for instance the order of the modulation, for the purpose of achieving a more powerful and effective interference cancellation.

Different interference cancellation techniques may be considered for the purpose of using the extended DCI information received by the UE.

Figure 5:
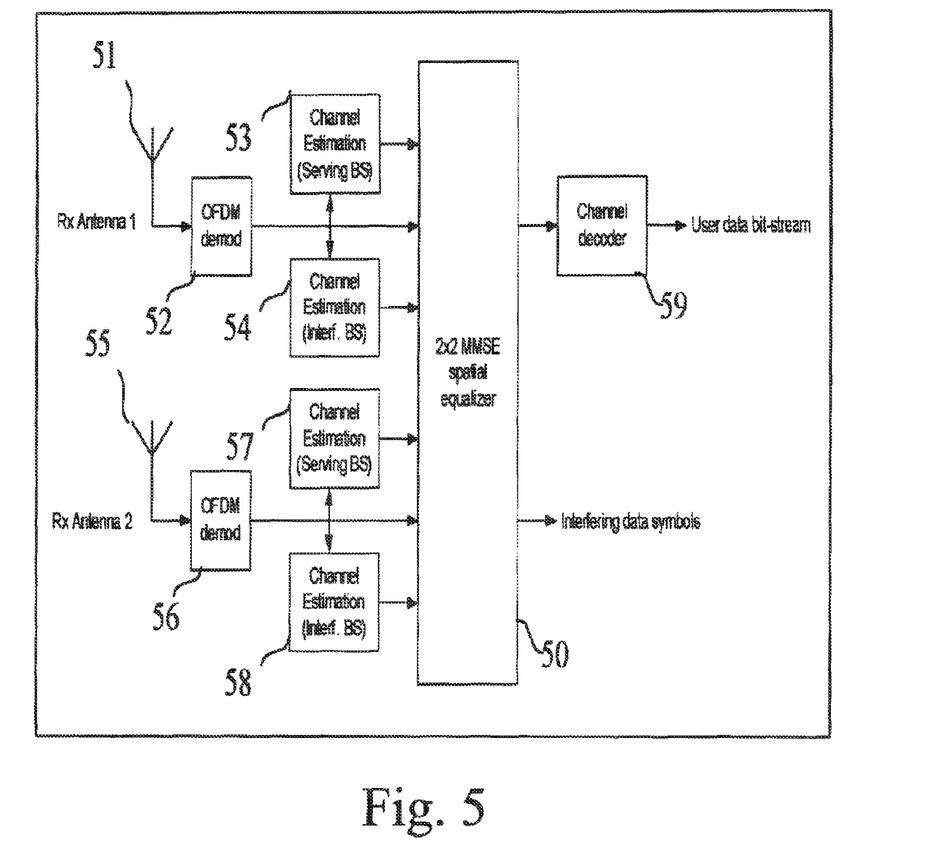
FIG. 5 illustrates one embodiment of a receiver including two antennas and an MMSE equalizer.

In one embodiment, as shown in FIG. 5, the UE includes a receiver.

With respect to FIG. 5, there is illustrated the general architecture of one embodiment of a receiver providing inter-cell interference cancellation.

Such receiver can be advantageously based on the architecture of a well-known SU-MIMO receiver which, as will be seen below, will be capable of properly achieving inter-cell interference cancellation.

With respect to FIG. 5, one sees one embodiment which comprises a MMSE equalizer 50 decoding the single-antenna 51 transmission coming from the serving eNB 150. The receiver further includes a OFDM demodulation block 52 receiving the signal coming from antenna 51 and two channel estimation blocks 53 and 54, respectively for estimating the channel of the Serving BS 150 and that of the interfering BS 250.

Similarly, the receiver includes a second antenna 55, an OFDM demodulation block 56 receiving the signal coming from antenna 55 and two channel estimation blocks 57 and 58, respectively for estimating the channel of the Serving BS 150 and that of the interfering BS 250.

The MMSE equalizer 50 provides equalization of the signals received by the two antennas 51 and 55, and processed by blocks 52-54 (resp. 56-58), for the purpose of outputting, on one side, the useful data symbols (UDS) which are forwarded to a channel decoder 59 and the interfering data symbols.

Thanks to the availability of a spare receiving antenna 55 and also to the knowledge of the extended Downlink Control information, an efficient interference cancellation process can be achieved on the strongest interfering stream from a neighboring cell.

Advantageously, the interference cancellation receiver does not require any additional complexity compared to a SU-MIMO receiver when only the strongest interference source is cancelled.

Clearly, the use of the extended Downlink Control Information, which is reported by the neighboring cell, may depend on the complexity and degree of sophistication of the considered receiver.

Indeed, different architectures may be considered based on a joint decoder, which can be a so-called Sphere Decoder or even the more complex Maximum Likelihood (ML) decoder.

Figure 6:
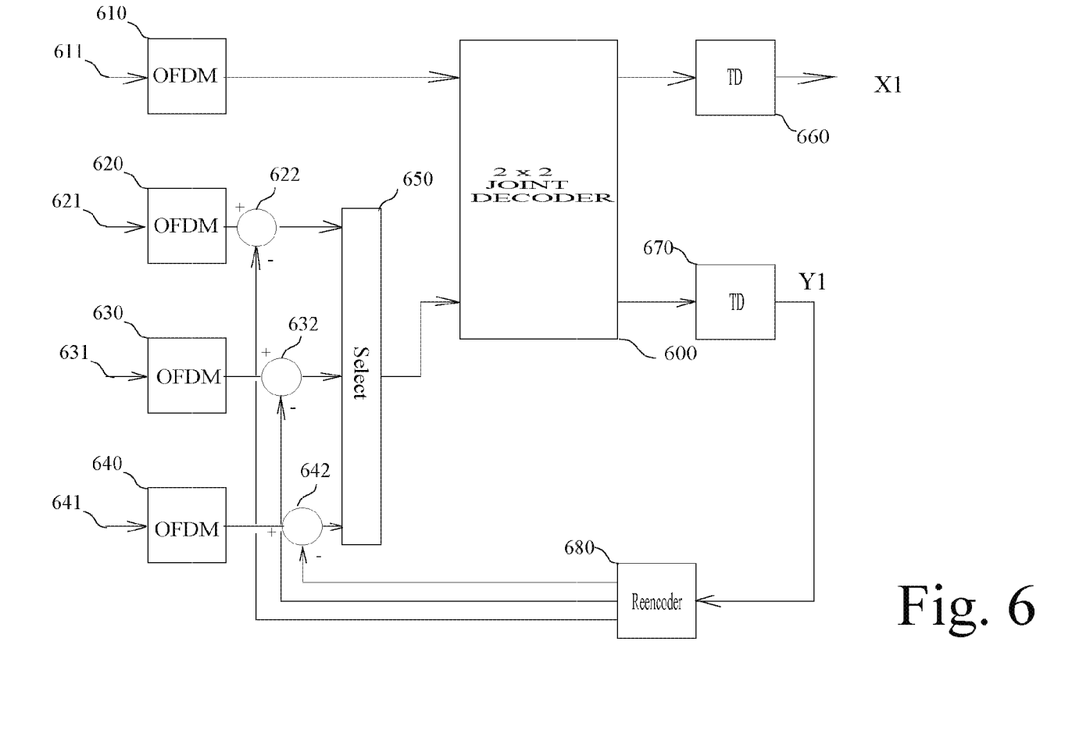
FIG. 6 illustrates a second embodiment of a receiver including four antennas and a 2×2 joint decoder.
Figure 7:
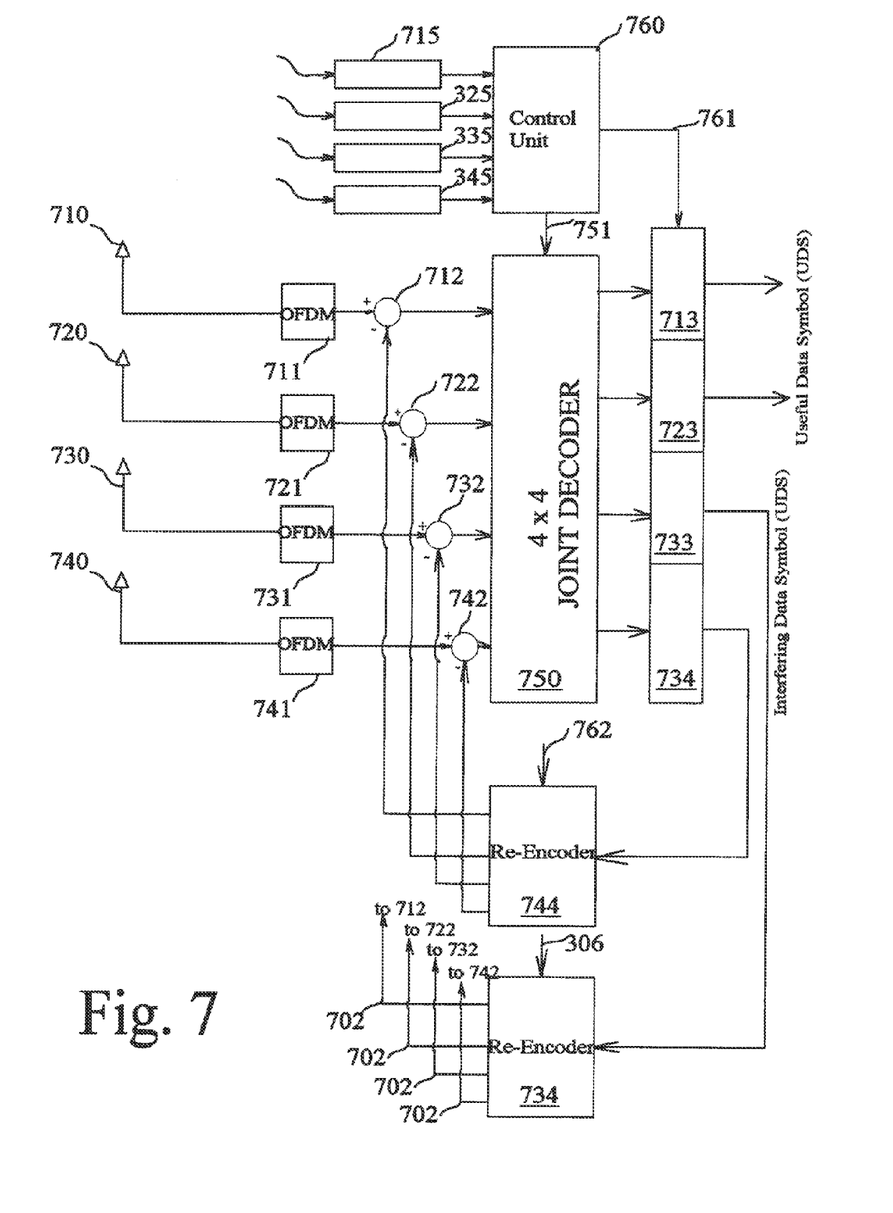
FIG. 7 illustrates a third embodiment of a receiver which includes four antennas and a 4×4 joint decoder.

In order to illustrate the wide possibilities of application of the process of the invention, consider two particular embodiments, respectively based on four antennas (and not only two antennas), and using a joint 2×2 decoder, as shown in FIG. 6, or a 4×4 joint decoder as illustrated in FIG. 7.

FIG. 6 shows one embodiment of a receiver comprising four antennas and four OFDM demodulation blocks, respectively 610, 620, 630 and 640 which are used for performing the basic functions of time and frequency synchronization, Cyclic Prefix suppression and IFFT conversion. Block 610 receives via a lead 611 the signal received from the first antenna of UE 110, while block 620 receives via a lead 621 the signal received from the second antenna of UE 110. The signal received from the third antenna (resp. the fourth) of UE 110 is forwarded via a lead 631 (resp. 641) to OFDM block 630 (resp. 640).

A 2×2 joint decoder 600 provides the decoding of two data symbols, comprises two inputs and an output. The first input of joint decoder 600 receives the data symbol forwarded by OFDM demodulator 610 (assumed to receive the useful data symbol) while the second input receives the output of a selector block 650 having three inputs.

Selector block 650 has a first input which receives the output of an adder/subtractor 622, which positive input receives the output of demodulation block 620, and which negative input receives a first output of a reencoder block 680.

Similarly, selector block 650 has a second input (resp. third input) which receives the output of an adder/subtractor 632 (resp. 642), which positive input receives the output of demodulation block 630 (resp. 640), and the negative input receives the second (resp. the third) output of reencoder block 680.

Joint decoder 600 has two outputs which generate the data and interfering symbols which are respectively forwarded to two turbo decoders, respectively 660 and 670).

It should be noticed that 2×2 joint decoder achieves the decoding of the two symbols X1 and I1, with X1 being the useful data symbol (UDS) and I1 being the Interfering data Symbol (IDS) corresponding to the particular one among the three interfering signals provided by the three OFDM demodulation blocks 620-630-640 which shows the higher channel power.

By decoding the higher channel power, that is to say symbol X1, the latter can be re-injected into re-encoder 680 so as to compute the OFDM symbol which is then subtracted to adder/subtractor 622-632-642 forming the cancellation loop.

With respect to FIG. 7, there will be now described another embodiment of the invention, based on the use of a 4×4 joint decoder which allows the possibility to jointly decode two streams of Useful Data Symbol (UDS) together with two high power interfering data symbol (IDS). This embodiment is particularly suitable for receiving the two data streams exchanged for base station 150 and also to cancel the interference of the more powerful interfering base station 250, for instance.

The receiver is based on the use of four distinctive OFDM demodulation blocks 711, 712, 713 and 714, respectively receiving the signal from a corresponding antenna, 710, 720, 730 and 740. As above, each OFDM block achieves timing and frequency synchronization, cyclic prefix discard as well as the IFFT transform.

The receiver further includes a 4×4 joint decoder 750, for instance a sphere decoder, for providing the joint decoding of four distinctive OFDM streams, with four inputs and four outputs. Again, any joint decoder can be used, such as a linear equalizer, a serial interference canceller or a ML decoder.

OFDM block 711 has an output which is coupled to a positive input of an adder/subtractor 712 having two inputs and an output which is forwarded to a first input of 4×4 joint decoder 750.

OFDM block 721 has an output which is coupled to a positive input of an adder/subtractor 722 having two inputs and an output which is forwarded to a second input of 4×4 joint decoder 750.

Similarly, OFDM block 731 has an output which is coupled to a positive input of an adder/subtractor 732 having two inputs and an output which is forwarded to a third input of 4×4 joint decoder 750.

At last, OFDM block 741 has an output which is coupled to a positive input of an adder/subtractor 742 having two inputs and an output which is forwarded to a fourth input of 4×4 joint decoder 750.

Joint decoder 750 has four outputs which generates the four decoded data streams, respectfully forwarded to four corresponding turbo decoders, 713-723-733 and 743 respectively.

Turbo decoders 713 and 723 are allocated to the decoding of the two useful data streams carried by the UDS symbols, while turbo decoders 733 and 743 are dedicate to decode two interfering Data Symbols (IDS) based on the knowledge of the rate of coding included in the extended Downlink Control Information.

In order to achieve efficient interfering cancellation, the two IDS generated by Turbo decoder 733 and 743 are respectively forwarded to two re-encoders, respectively 744 and 734, and are used for the purpose of re-generating the OFDM symbols corresponding the interfering signal.

Re-encoder 744 has four outputs which are respectively forwarded to the first negative input of adder/subtractors 712-742, while re-encoder 734 has four outputs which are respectively forwarded to the second negative input of adder/subtractors 712-742.

The receiver further includes four Channel Estimation blocks, 715, 325, 335 and 345 respectively receiving the signal through the four antennas, and which are coupled to a control unit 760 providing the main control signals used for performing the process which was described above.

Control unit 760 achieves control of the 4×4 joint decoder 750 (via control line 751), turbo decoders 713-743 (via control line 761) as well as re-encoder 734 (via line 306) and re-encoder 744 (via line 762).

Control unit 760 controls the 4×4 joint decoder 460 for detecting the two useful data streams with the two most powerful interfering data streams detected by channel estimation blocks 715, 325, 335 and 345.

Thanks to the re-encoding of the two interfering data symbols (IDS) by re-encoders 734 and 744, the corresponding contributions can be suppressed from the received signals and cancelled before being detected again by Sphere Decoder or more generally by the 4×4 joint decoder in order to improve the detection process.

It can be seen that the invention is highly useful for using MIMO structure of the UE 110 for the purpose of canceling the interference from the other present base stations or antennas.

It has been seen that the invention achieves an extended downlink control information scheme which is applied to a mobile communication system based on synchronous OFDM and more in particular to the LTE-Advanced, to allow the UE (User Equipment) canceling the inter-cell interference (interference due to neighbor base stations).

The invention claimed is:

1. A process for cancelling inter-cell interference between neighboring cells in a synchronized OFDM communication system by allowing communication between a user equipment (UE) comprising at least two antennas and a first base station in a first cell, the process comprising:
    arranging a communication channel between the first base station and a neighboring base station;
    using the communication channel to provide to the first base station from the neighboring base station information relevant to communicating between the neighboring base station and a strongest interfering UE signal from an interfering UE in the neighboring base station's cell, wherein the strongest interfering UE signal is interfering with the UE in the first cell; and
    communicating, by the first base station to the UE, information comprising downlink control information and extended downlink control information, wherein the extended downlink control information comprises information received from the neighboring base station comprising rate of coding and modulation type, the extended downlink control information being adaptable by the UE for cancelling interference from the strongest interfering UE signal from the neighboring base station's cell, the cancelling of interference comprises:
        decoding the strongest interfering UE signal based on the extended downlink control information;
        re-injecting the decoded strongest interfering UE signal into a re-encoder for the purpose of re-generating OFDM symbols corresponding to the strongest interfering UE signal; and
        subtracting the re-generated OFDM symbols in a cancellation loop.

2. The process according to claim 1, wherein the interference cancellation information is adapted for use by a MMSE equalizer, a near-Maximum Likelihood decoder, or a sphere decoder.

3. The process according to claim 1, wherein the rate of coding is adapted for use by a receiver in the UE to re-encode detected interference data symbols (IDS) and in-inject re-encoded IDS in an interference cancellation loop.

4. The process according to claim 1, wherein the synchronized OFDM communication system is a LTE-advanced network.

5. The process according to claim 1, further comprising transmitting the downlink control information and the extended downlink control information to the UE by the first base station via allocated subcarriers with in the OFDM frame and sub-frame being transmitted.

6. The process according to claim 1, wherein the combination of the downlink control information and extended downlink control information further comprise at least one of the order of the modulation, the number of resource blocks (RB), the localization of the resource blocks, and information relevant to hybrid automatic repeat requests (HARD) and resource block (RB) mapping.

7. The process according to claim 1, wherein the canceling interference is executed in a receiver comprising four antennas; four OFDM demodulation blocks each connected to one of the for antennas, wherein each OFDM demodulation block is configured to perform functions of time and frequency synchronization, cyclic prefix suppression, and IFFT conversion; and
wherein decoding further comprises decoding useful OFDM symbols and the strongest interfering UE signal by a 2×2 joint decoder.

8. the process according to claim 1, wherein the process is adapted to be performed in accordance with at least one standard from a group of standards comprising DAB, DVBT, WiMax, IEEE 802.16, ADSL, WLAN IEEE 802.11 a/g.

9. A base station for a synchronous OFDM communication system comprising:
a transceiver configured to transmit a communication channel between the base station and a neighboring base station, the communication channel being configured to exchange information relevant to a communication of the neighboring base station and a strongest interfering UE in the neighboring base station's cell;
a downlink communication transceiver configured to communicate with a UE in the base station's cell by providing information comprising downlink control information and extended downlink control information, wherein the extended downlink control information comprises exchanged information received from the neighboring base station including rate of coding and modulation type, and wherein the UE is configured to use the extended downlink control information in an interference cancelation circuit that cancels interference from the strongest interfering UE in the neighboring base station's cell, the interface cancellation circuit comprising:
a decoder configured to decode a demodulated strongest interfering UE signal based on the extended downlink control information;
a re-encoder, as part of a feedback loop, configured to re-encode the demodulated strongest interfering UE signal into re-generated OFDM symbols corresponding to the strongest interfering UE signal; and
a subtractor configured to subtract the re-generated OFDM symbols from received and demodulated OFDM symbols so as to cancel received and demodulated OFDM symbols received from the strongest interfering UE.

10. The base station according to claim 9, wherein the interference cancellation circuit comprises at least one of a MMSE equalizer and a sphere decoder.

11. A user equipment (UE) for a synchronized OFDM communication system allowing communication with a first base station, the UE comprising:
at least two antennas;
a receiver, connected to the at least two antennas, configured to receive from the first base station downlink control information and extended downlink control information comprising information including rate of coding and modulation type relevant to an interfering communication of a strongest interfering UE located in a neighboring cell, wherein the strongest interfering UE is interfering with the UE in communication with the first base station; and
wherein the receiver comprises an interference cancellation circuit comprising:
a decoder configured to decode a demodulated strongest interfering UE signal based on the extended downlink control information;
a re-encoder in a cancelation loop configured to re-enable the demodulated strongest interfering UE signal into re-generated OFDM symbols corresponding to the strongest interfering UE signal; and
a subtractor configured to subtract the re-generated OFDM symbols from received and demodulated OFDM symbols so as to cancel received and demodulated OFDM symbols from the strongest interfering UE located in a neighboring cell.

12. The UE according to claim 11, wherein the receiver further comprises a MMSE equalizer connected between the at least two antennas and the decoder.

13. The UE according to claim 11, wherein the UE is adapted for use in a LTE-advanced network.

14. The UE according to claim 11, wherein the decoder comprises a near-maximum likelihood decoder or a sphere decoder.

* * * * *